(12) United States Patent
Watson et al.

(10) Patent No.: US 11,348,031 B2
(45) Date of Patent: May 31, 2022

(54) MODELING MASTERY IN DISTRIBUTED COGNITIVE SYSTEMS AND STORING THE RESULTS IN A LEDGER

(71) Applicant: International Business Machines Corporation, Armonk, NY (US)

(72) Inventors: Patrick Watson, Montrose, NY (US); Maria Chang, Irvington, NY (US); Jae-Wook Ahn, Nanuet, NY (US); Sharad Chandra Sundararajan, Bangalore (IN); Prasenjit Dey, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 16/108,324

(22) Filed: Aug. 22, 2018

(65) Prior Publication Data
US 2020/0065697 A1    Feb. 27, 2020

(51) Int. Cl.
G06N 20/00    (2019.01)
G06Q 10/06    (2012.01)

(52) U.S. Cl.
CPC ....... *G06N 20/00* (2019.01); *G06Q 10/06393* (2013.01)

(58) Field of Classification Search
CPC .................... G06N 20/00; G06Q 10/06393
USPC ....................................................... 705/3–44
See application file for complete search history.

(56) References Cited

U.S. PATENT DOCUMENTS

| | | | | |
|---|---|---|---|---|
| 5,117,353 | A * | 5/1992 | Stipanovich | G06Q 10/06 705/7.14 |
| 6,224,486 | B1 | 5/2001 | Walker et al. | |
| 7,192,352 | B2 | 3/2007 | Walker et al. | |
| 8,234,141 | B1 * | 7/2012 | Flockhart | H04M 3/5233 705/7.13 |
| 8,407,528 | B2 * | 3/2013 | Larson | G06F 11/3495 714/45 |

(Continued)

OTHER PUBLICATIONS

Wilhite et al., "Agent-based models and hypothesis testing: and example of innovation and organizational networks", The Knowledge Engineering Review, vol. 27:2, 221-238, Cambridge University Press, doi: 10.107/S0269888912000148, (Year: 2012).*

(Continued)

*Primary Examiner* — Frantzy Poinvil
(74) *Attorney, Agent, or Firm* — Patterson + Sheridan, LLP

(57) ABSTRACT

Techniques for assessing the proficiency of artificial intelligence agents and users in a given knowledge domain are described. A plurality of proficiency agents can be initialized with a plurality of proficiency scores, by performing a plurality of assessments between pairs of proficiency agents selected from the plurality of proficiency agents. A first client device associated with a first user is matched with a first proficiency agent of the plurality of proficiency agents, based on a first proficiency score associated with the first user and a second proficiency score of the plurality of proficiency scores corresponding to the first proficiency agent. Assessments results of an assessment performed between the first client device and the first proficiency agent are received, and a rating system update function is used to update the first proficiency score and the second proficiency score, based on the assessment results.

20 Claims, 6 Drawing Sheets

(56) References Cited

U.S. PATENT DOCUMENTS

| | | | |
|---|---|---|---|
| 8,612,272 B1* | 12/2013 | Aykin | G06Q 10/0631 |
| | | | 705/7.11 |
| 9,239,989 B2 | 1/2016 | Bouqata et al. | |
| 10,084,918 B2* | 9/2018 | Conway | G06Q 30/016 |
| 11,076,049 B2* | 7/2021 | Veloso | G06Q 10/06395 |
| 11,100,052 B2* | 8/2021 | Estes | G06F 21/6209 |
| 2006/0271421 A1* | 11/2006 | Steneker | G06Q 10/063112 |
| | | | 705/7.14 |
| 2007/0011073 A1* | 1/2007 | Gardner | G06Q 30/02 |
| | | | 705/35 |
| 2008/0120189 A1* | 5/2008 | Singh | G06Q 30/0601 |
| | | | 705/16 |
| 2012/0215578 A1* | 8/2012 | Swierz, III | G06Q 50/205 |
| | | | 705/7.14 |
| 2013/0238403 A1* | 9/2013 | Benson | G06Q 10/06 |
| | | | 705/7.42 |
| 2014/0324765 A1 | 10/2014 | Sweeney et al. | |
| 2015/0030152 A1* | 1/2015 | Waxman | H04M 3/5233 |
| | | | 379/265.11 |
| 2015/0088568 A1* | 3/2015 | Lambroschini | G06Q 10/063112 |
| | | | 705/7.14 |
| 2017/0221165 A1* | 8/2017 | Sawant | G06Q 10/10 |
| 2017/0263150 A1* | 9/2017 | Gordon | G06Q 10/063112 |
| 2018/0001206 A1* | 1/2018 | Osman | A63F 13/85 |
| 2018/0115646 A1* | 4/2018 | Conway | H04M 3/5238 |
| 2019/0392049 A1* | 12/2019 | Estes | G06Q 50/205 |

OTHER PUBLICATIONS

IPCOM000134526D, "An Ontology-Based Architecture for Adaptive Work-Centered User Interface Technology," http://ip.com/IPCOM/000134526D, Mar. 8, 2006.

Anonymous, "Social Data Analysis as Unobtrusive Measure for Validating Human Behavior Assessment or Test (Psychometric) Results," http://ip.com/IPCOM/000208050D, Jun. 21, 2011.

Anonymous, "Method and Apparatus for Intentional Cognitive Engagement Extender," http://ip.com/IPCOM/000247821D, Oct. 6, 2016.

Swan, M., "Blockchain Thinking—The Brain as a Decentralized Autonomous Corporation," Commentary, IEEE Technology & Society Magazine, Dec. 2015.

Professor Mark E. Glickman, "Example of the Glicko-2 system," Boston University, Nov. 30, 2013 6 pages.

* cited by examiner

MODELING MASTERY IN DISTRIBUTED COGNITIVE SYSTEMS AND STORING THE RESULTS IN A LEDGER

BACKGROUND

The present disclosure relates to learner models, and more specifically, to assessing a proficiency score of a user through the use of proficiency agents and a rating system update function.

Intelligent tutor systems provide learning experiences to users without requiring intervention from a human teacher. However, it can be difficult to quantify a user's knowledge in a given knowledge space. Similarly, in systems where multiple different artificial intelligence agents are available to perform proficiency assessments, it can be difficult to quantify the difficulty of these various proficiency assessments.

SUMMARY

According to one embodiment of the present disclosure, a method is provided. The method includes: initializing a plurality of proficiency agents with a plurality of proficiency scores, by performing a plurality of assessments between pairs of proficiency agents selected from the plurality of proficiency agents, matching a first client device associated with a first user with a first proficiency agent of the plurality of proficiency agents, based on a first proficiency score associated with the first user and a second proficiency score of the plurality of proficiency scores corresponding to the first proficiency agent, receiving assessments results of an assessment performed between the first client device and the first proficiency agent, and updating, using a rating system update function, the first proficiency score associated with the first user and the second proficiency score corresponding to the first proficiency agent, based on the assessment results.

According to another embodiment of the present disclosure, a system is provided. The system includes: one or more computer processors, and a memory containing computer program code that, when executed by operation of the one or more computer processors, performs an operation including: initializing a plurality of proficiency agents with a plurality of proficiency scores, by performing a plurality of assessments between pairs of proficiency agents selected from the plurality of proficiency agents, matching a first client device associated with a first user with a first proficiency agent of the plurality of proficiency agents, based on a first proficiency score associated with the first user and a second proficiency score of the plurality of proficiency scores corresponding to the first proficiency agent, receiving assessments results of an assessment performed between the first client device and the first proficiency agent, and updating, using a rating system update function, the first proficiency score associated with the first user and the second proficiency score corresponding to the first proficiency agent, based on the assessment results.

Yet another aspect of the present disclosure includes a computer-readable storage medium. The computer-readable storage medium contains computer program code that, when executed by operation of one or more computer processors, performs an operation including: initializing a plurality of proficiency agents with a plurality of proficiency scores, by performing a plurality of assessments between pairs of proficiency agents selected from the plurality of proficiency agents, matching a first client device associated with a first user with a first proficiency agent of the plurality of proficiency agents, based on a first proficiency score associated with the first user and a second proficiency score of the plurality of proficiency scores corresponding to the first proficiency agent, receiving assessments results of an assessment performed between the first client device and the first proficiency agent, and updating, using a rating system update function, the first proficiency score associated with the first user and the second proficiency score corresponding to the first proficiency agent, based on the assessment results.

Yet another aspect of the present disclosure includes a method. The method includes: matching a first client device associated with a first user with a first proficiency agent form a plurality of proficiency agents, based on a first proficiency score associated with the first user and a second proficiency score from a plurality of proficiency scores associated with the plurality of proficiency agents and corresponding to the first proficiency agent, receiving assessment results of an assessment performed between the first client device and the first proficiency agent, and updating, using a rating system update function, the first proficiency score associated with the first user and the second proficiency score corresponding to the first proficiency agent, based on the assessment results.

Yet another aspect of the present disclosure includes a system. The system includes: one or more computer processors, and a memory containing computer program code that, when executed by operation of the one or more computer processors, performs an operation including: matching a first client device associated with a first user with a first proficiency agent form a plurality of proficiency agents, based on a first proficiency score associated with the first user and a second proficiency score from a plurality of proficiency scores associated with the plurality of proficiency agents and corresponding to the first proficiency agent, receiving assessment results of an assessment performed between the first client device and the first proficiency agent, and updating, using a rating system update function, the first proficiency score associated with the first user and the second proficiency score corresponding to the first proficiency agent, based on the assessment results.

Yet another aspect of the present disclosure includes a computer-readable storage medium. The computer-readable storage medium contains computer program code that, when executed by operation of one or more computer processors, performs an operation including: matching a first client device associated with a first user with a first proficiency agent form a plurality of proficiency agents, based on a first proficiency score associated with the first user and a second proficiency score from a plurality of proficiency scores associated with the plurality of proficiency agents and corresponding to the first proficiency agent, receiving assessment results of an assessment performed between the first client device and the first proficiency agent, and updating, using a rating system update function, the first proficiency score associated with the first user and the second proficiency score corresponding to the first proficiency agent, based on the assessment results.

DETAILED DESCRIPTION

Conventional question and answer systems and/or artificial intelligent systems that receive and assess responses from users can suffer from a mismatch in relation to the disparity in skills between the system (e.g., an educational chatbot) and the user (e.g., a student), and visa-versa. Accordingly, one or more embodiments of the present disclosure aim to more accurately match users with systems that are within a comparable skill level and/or competence. According to one embodiment, system-on-system engagements and user versus system engagements are modelled using encounter tensors, and the encounter tensors can be processed using an update function for a rating system to update a competence metric for the users and/or the systems. One or more embodiments can also determine an interest level for one or more users with respect to skills/competence material (e.g., educational materials) presented by a system, and can form a matching metric/score for pairing users with systems based on the same. Moreover, a ledger, such as a blockchain ledger, can store the metric update history and engagement history for both users and systems. Doing so enables the verification of the veracity of a most recent competence score associated with one or more systems and/or one or more users.

Figure 1:
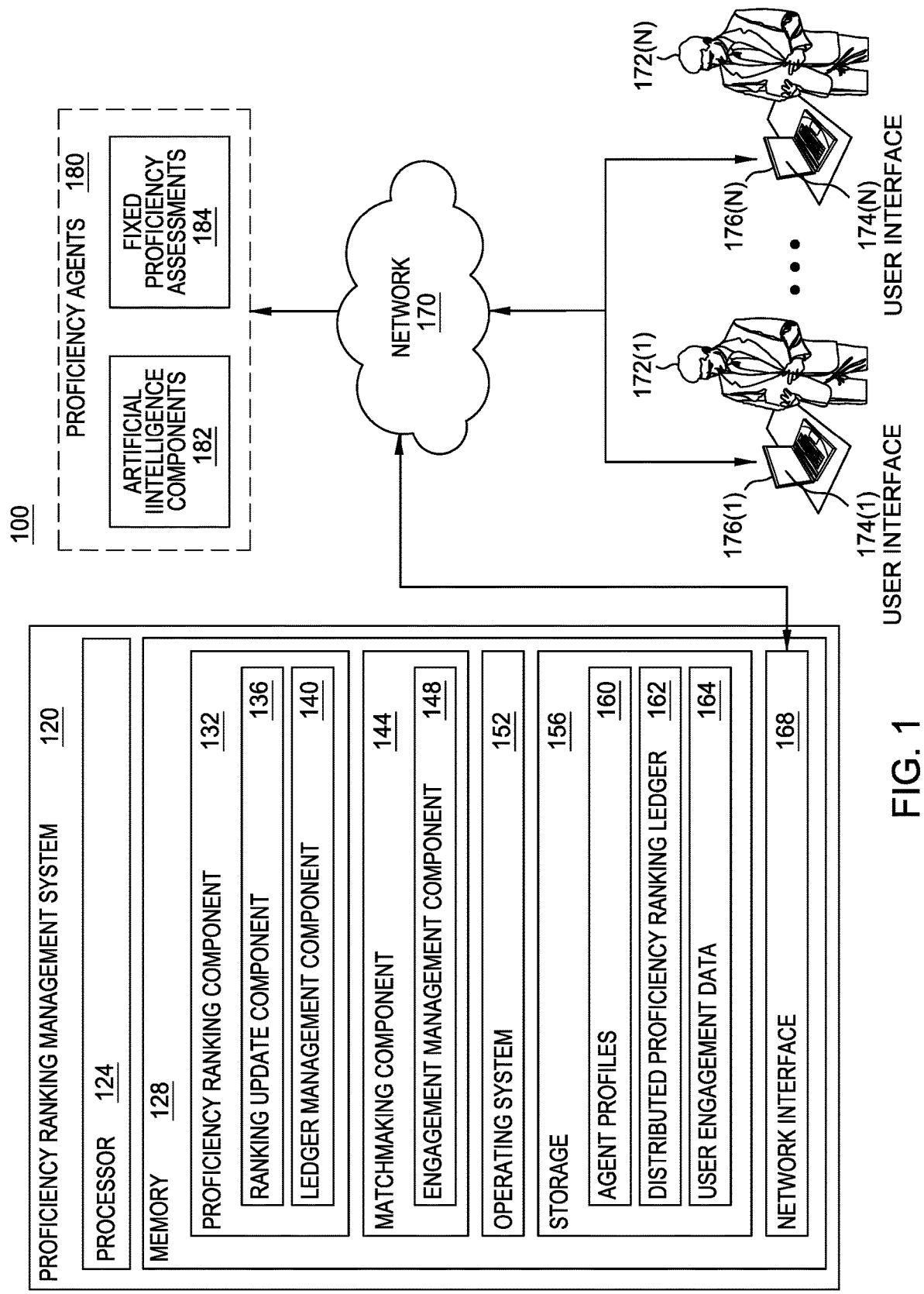
FIG. 1 illustrates a proficiency ranking system according to at least one embodiment of the present disclosure.

FIG. 1 illustrates at least one embodiment of a proficiency ranking system and storage system 100 according to at least one embodiment of the present disclosure. The proficiency ranking management and storage system 100 is a computer system with one or more hardware and/or software components and subcomponents for executing one or more tasks. As shown, the system 100 includes proficiency agents 180. In one embodiment, the proficiency agents 180 can be any question and answer system (Q/A system) or any artificial intelligence system (AI system) that has the capacity to process natural language inputs, speech or text inputs, output natural language responses, and/or provide a vehicle for assessing the accuracy and nature of an input from a user, whether the input is a natural language speech input, audio-visual input, natural language text input, or a selection from one or more options (automated multiple choice exam). In one embodiment, the proficiency agents 180 are automated tutors (e.g., educational chatbots) that are capable of providing instructional content and interacting with client devices 176(1)-176(N), associated with one or more users/clients 172(1)-(N). Additionally, the proficiency agents 180 can be configured to process and assess responses, in text or speech format, from the same and from one another.

Although not expressly shown in the Figures, the individual users, in certain embodiments, can interface directly with the proficiency agent using mechanisms attached or associated with the proficiency agents, e.g., a student interfacing with an education chatbot by speaking to it, and the proficiency agent processing the speech using any suitable natural language processing approach.

In one embodiment, the proficiency agents 180 can be either artificial intelligence components 182, such as the educational chatbots discussed above or a fixed proficiency assessment 184, which can include any electronic medium for testing a user's skill or ability with respect to a particular topic, e.g., an electronic exam that presents questions for a user to answer, and where the user can input the answer by any suitable means.

The system 100 further includes one or more memory components 128, which can include any suitable data storage technology, such as semiconductor based memory devices, flash memory, magnetic memory devices and systems, optical memory devices and systems, fixed memory and removable memory, or some combination of these. The one or more memory components contain one or more computer readable components that can be executed by a processor 124, including a proficiency ranking component 132 and a matchmaking component 144.

In one embodiment, the matchmaking component 144 can set or determine an initial competency metric or skill metric for one or more proficiency agents 180, where the competency metric or skill metric is for a common skill or common competency shared between the one or more proficiency agents or between the one or more proficiency agents and one or more users 172(1), 172(N).

In one embodiment, the skills or competencies that the matchmaking component will engage between the one or more proficiency agents 180 will be related to instructional content, e.g., an academic topic or skill such as mathematics, history, literature, science, etc. In one embodiment, where the proficiency agents are individual human users, or when an engagement is between an agent 180 and a client device 176(1) (or user 172(1) directly), e.g., where the client is a human user, the metric can be associated with an emotional trait or concentration trait in relation to the content received by the human user from the agent.

In one embodiment, the initial proficiency agent scores can be set manually by a user 172(1), 172(N) or the matchmaking component 144 can set them by coordinating with the proficiency ranking component 132 to initialize one or more competitive game algorithms for assessing interactions between agents 180 and between agents 180 and users 172(1), 172(N) (discussed in greater details below).

The matchmaking component 144, in one embodiment, includes an engagement management component 148 that can determine which proficiency agents 180 will engage one another, what skill or competency will be engaged, and how many engagements will take place between the same proficiency agents 180 or different agents either simultaneously or at different times.

In one embodiment, the engagement management component 148 will make a particular engagement occur between one or more agents 180 and/or one or more agents 180 and a client device 176(1)-(N) (or by a user 172(1)-(N) directly where appropriate) using one or more tensors, e.g., two-dimensional arrays representing the agents and skills to be engaged, where the arrays of the tensor correspond to metrics associated with agent qualities (e.g., skill in a particular subject, emotional states), and parameter values that describe those qualities. The engagement management component 148 can isolate one or more of a particular skill or competency for evaluation at issue when more than one topic or skill is engaged (e.g., a mathematical assessment related to a scientific problem may engage both science and mathematical competency), and by setting and using the appropriate tensors, the engagement management component 148 can ensure only one skill is assessed. In one embodiment, the encounter tensor [E] characterizes which skills or cognitive features of the agents 180 and/or users 172(1), 172(N) interact. As discussed below, the matchmaking component 144 can coordinate with the proficiency ranking component 132 to apply the competitive game algorithm to the skill(s) or competency(s) at issue, with the encounter tensor operating as a filter for ensuring that only relevant features are assessed, and thus continuously, and in certain embodiments where more than one skill is at issue, simultaneously, generating metrics as one or more agents and one or more users interact with respect to relevant items only.

The matchmaking component 144 coordinates with the proficiency ranking component 132 when an assessment of the engagement occurs, and ultimate scores associated therewith, are determined, outputted, and stored. Furthermore, the matchmaking component 144 will coordinate with the ranking component 132 (discussed below) to determine when a sufficient number of iterations of engagements between one or more agents 180 have taken place such that the agents can be matched appropriately amongst themselves in the future and/or an agent 180 can be appropriately matched with a client device 176(1), 176(N) (or user directly where appropriate). For example, after sufficient iterations have taken place, a chat bot operating as an educational tutor can be matched to a user, e.g., a student, for instruction on a particular subject where the chatbot and the student are appropriately matched, e.g., the chatbot has an initial higher score than the user, but not such that it can overwhelm the student in a particular engagement. The matching can also be with respect to a user interest level which is determined by running the competitive game algorithm with respect to events that demonstrate user interest, e.g., frequency of response to an agent 180 with respect to a particular topic, affirmative positive input from the user via a suitable interface, etc.

When the engagement management component 148 isolates the skill or feature to be assessed and the matchmaking component 144 and the ranking component 132 coordinate to determine when sufficient number iterations have taken place, the overall efficiency of system 100 is improved in terms of computer efficiency, as the number of computations necessary to achieve a suitable match is reduced, less resources are consumed to obtain a suitable match, and the ultimate quality of matching between proficiency agents 182 also improves.

As shown, the proficiency ranking component 132 includes a ranking update component 136 and a ledger management component 140. The ranking update component 136 evaluates any engagement between one or more agents 180 and/or between one or more agents 180 and one or more client devices 172(1), 172(N) (or users directly where appropriate). The ranking update component 136 can update the score or metric associated with the skill or feature engaged between the one or more agents 180 and/or between the one or more agents 180 and one or more clients 172 depending on the outcome of the engagement. For example, if an educational chatbot engages another educational chatbot and is able to correctly answer particular topic questions asked by the other chat, the educational chatbot's score with respect to that topic can increase while the other chatbot's score can decrease. In another example, if a student is able to answer questions presented by a chatbot at a particular accuracy rate and/or in a particular time frame, then the student's skill score can increase and/or the chatbot's skill score can decrease. In another embodiment, a user's emotional and/or interest state when encountering a particular subject or method of presentation is scored based on measurable features related to user engagement, e.g., express input of displeasure by the user via a suitable interface of the agent, timing the frequency of inputs and responses from the user into the agent, etc., which themselves can be assessed using the competitive game algorithm to arrive at an interest score.

Any suitable scoring function, gaming function, competitive gaming function, or engagement game function, e.g., Elo rating system, Glicko, Glicko2, modified Glicko2 etc. can be used to assess and provided a score for the engagement between the one or more agents and/or the one or more agents 180 and one or more client devices 176(1), 176(N) (or users directly where appropriate), and serve as the update function. In one embodiment, the encounter tensors forms the basis for ensuring the scoring technique and update function focus only on the relevant skills, competencies and features desired to be assessed. In one embodiment, the Glicko2 algorithm is used by the ranking update component 136 to serve as the update function, where the algorithm is modified to be floating, e.g., there is no minimum score, which permits for novice entries on both the user and chatbot side, boundaries are placed on the upper score and bottom score to ensure that if a particularly disparate encounter takes place, e.g., an extremely adept chatbot with a novice student, does not unduly affect the overall distribution of scores, and a system constant is selected for the algorithm to ensure that multiple disparate encounters do not unduly influence a score of either a user or an agent.

Once a sufficient number of encounters and updates have taken place, e.g., a statistical acceptable number of engagements based on the structure of the selected algorithm and the number of users and agents, the engagement management component 148 can coordinate with the ranking update component 136 to end the iteration of engagements. As discussed below, the scores and engagement history can be stored into storage 156 by a ledger management component 140, and the engagement management component can then match agents 180 and client devices 172(1), 172(2) (or users directly where appropriate) based on the recorded scores in relation to a particular skill and competence and/or to a particular skill/competence and emotional metric.

In one embodiment, the ledger management component 140 can update storage 156 with the updated scores for the relevant agents 180 and/or users 172(1), 172(N). In one embodiment, the ledger management component 140 can input the scores for the various agents 180 and clients 172(1), 172(N) in the agent profile 160 repository, where in one embodiment the ledger management component 140 can coordinate with the engagement management component 148 to identify the relevant skills or competencies associated with each agent 180 and client 172(1), 172(N). The ledger management component 140 can also coordinate with the engagement management component 148 to store user engagement data and agent engagement data in the user engagement data 160 repository, e.g., storing a record of all of the engagements associated between the one or more agents 180 and/or the one or more client devices 176(1), 176(N) (or users 172(1), 172(N) directly where appropriate) with one or more agents 180.

In one embodiment, the ledger management component 140, in coordination with the engagement management component 148 and ranking update component 136, can ensure that that a distributed proficiency ranking ledger 162, e.g., a blockchain ledger 162, can be updated with the relevant data from the various engagements between agents and/or between agents and clients. Furthermore, the ledger management component 140 can receive requests from client devices 176(1), 176(N) to query the ledger 162 to verify the authenticity of and obtain a particular agent score, verify the existence and authenticity of and obtain a verification of a particular engagement between one or more agents and/or one or more agents 180 and users 172(1), 172(N) and/or to obtain a certificate (discussed in greater detail below) of one or more features associated with one or more agents 180 and/or clients 172.

The components in memory 128 of system 120 include the functionality as described herein and can include computer-readable code that, when executed by the one or more processors 124, cause the computer system 120 to perform one or more functionalities as described herein. Although not expressly shown, the components in memory 128 can be alternatively entirely or partially hardware, and internal to the one or more processors 124.

System 120 can communicate with the proficiency agents 180 and/or the clients 172(1), 172(N) by a network interface 168 and via network 170, where the network can be any suitable network including a local area network (LAN), a wide area network (WAN), or the connection may be made to an external computer (for example, through the Internet using an Internet Service Provider). The network interfaces 168 can be wired and/or wireless and communicate over the Internet/other network 170 via any communication technique.

Figure 2:
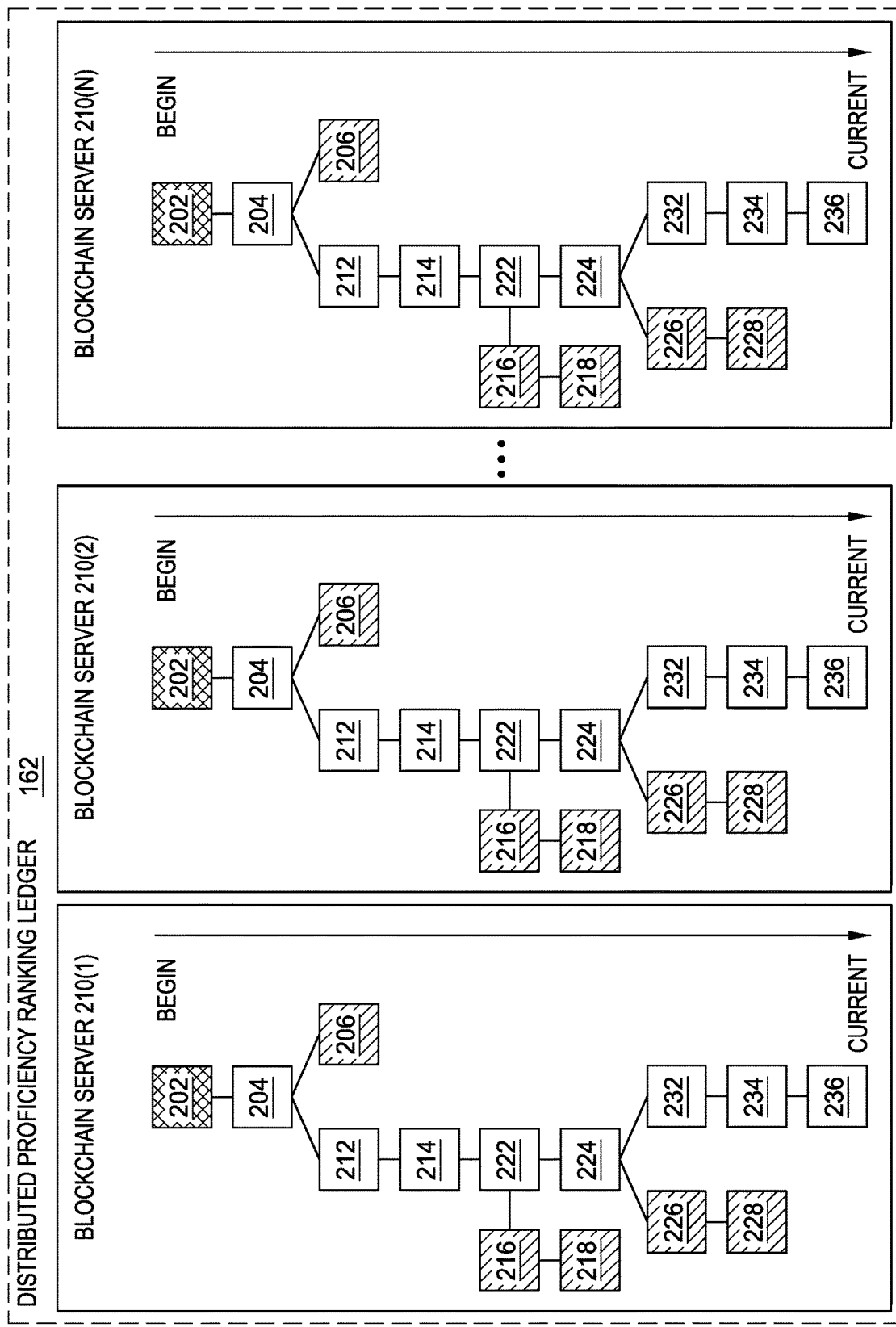
FIG. 2 illustrates a distributed ledger used with at least one embodiment of the present disclosure.

FIG. 2 illustrates a more detailed overview of an embodiment where the distributed proficiency ranking ledger 162 is a distributed blockchain ledger associated formed by one or more blockchain servers 201(1), 201(2) . . . 201(N) configured to perform a suitable cryptographic hash function. In one embodiment, each blockchain server contains a blockchain ledger with a root node or entry block 202 and ending with a current node or ending block 236. Each block in each server (e.g., blocks 202, 204, 206, etc.) contains information related to the engagement history and scores associated therewith amongst agents, and/or clients and agents. One or more client devices 176(1), 176(N) can initiate a request via the ledger management component 140 to verify and obtain a particular piece of data stored in an individual block in any one of the servers, such the most up to date metric for a particular agent's 180 score with respect to a specific skill, e.g., skill in science or mathematics, is provided to the requesting client. The request will result in any suitable cryptographic hash function and process being executed between and amongst the servers to ensure the veracity of the requested data. Once completed, the ledger management component 140 can output a certificate with the relevant information, e.g., agent 180 competency score, to the requesting client device 176(1), 176(N), which in turn can be accessible by a user, e.g., 172(1).

Figure 3:
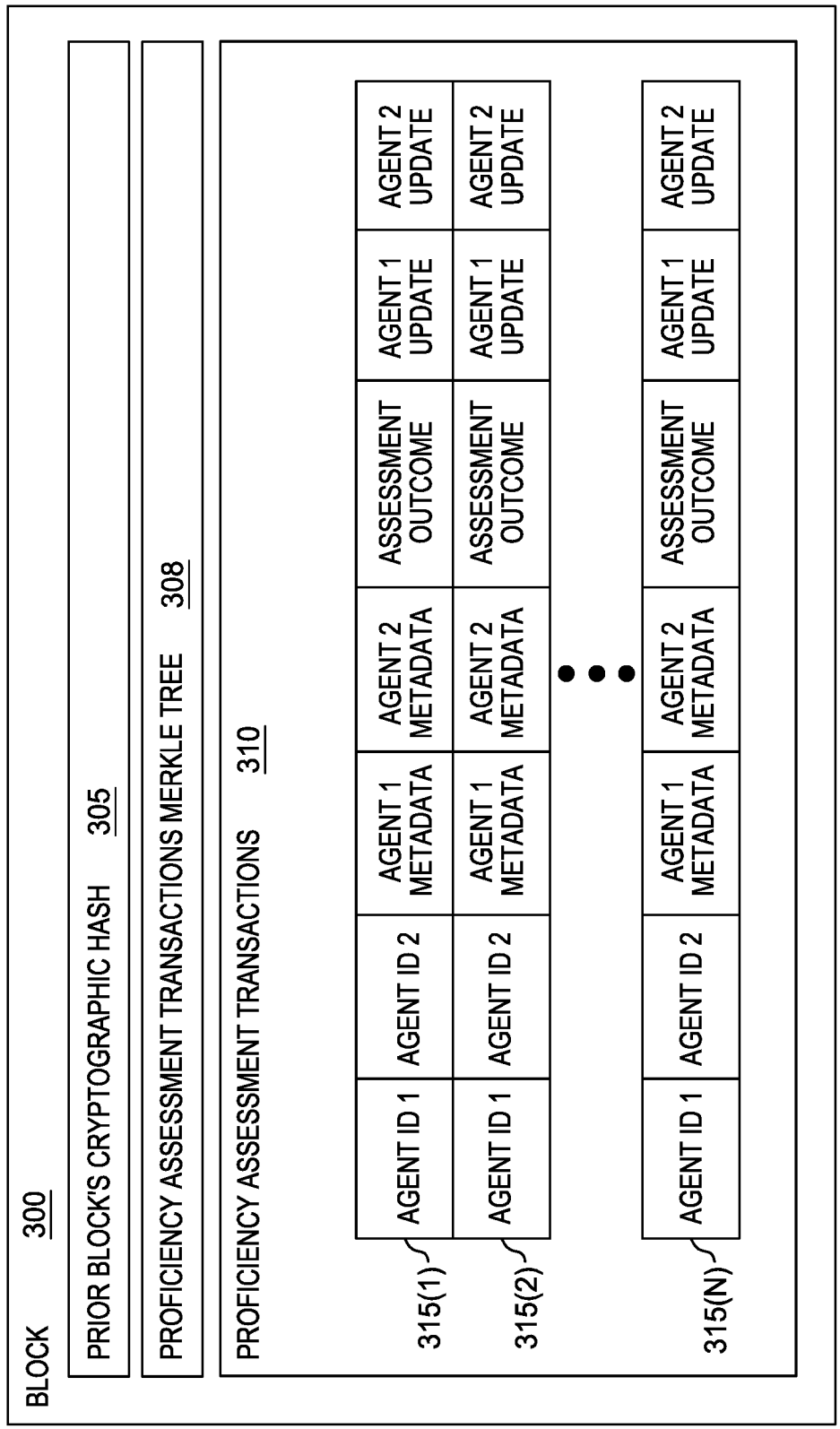
FIG. 3 illustrates a block in a block-chain ledger part of a distributed ledger system in accordance with at least one embodiment of the present disclosure.

FIG. 3 illustrates a more detailed overview of a particular block 300 in the distributed proficiency ranking ledger 162. The block includes a prior block's cryptographic has 305, which is used during a hashing process when data in a particular block 300 is to be access and/or outputted, a merkle or binary hash tree 308, which records the transaction history of the particular block, and proficiency assessment transactions 310, which reflects stored information concerning engagements between one or more agents and another agent or one or more clients and one or more agents. In this embodiment, as shown, data concerning various engagements that occurred between two agents is shown, e.g., two educational chatbots, where each entry 315(1), 315(2) . . . 315(n) contains information concerning a particular engagement. For example, entry 315(1) will identify a first agent with a first agent ID and a second agent with a second agent ID, where agent 1 metadata includes relevant information concerning the first agent, such as the type of agent, e.g., an educational chatbot, skills list, previous engagement history (with other bots or students), etc. Similarly agent metadata 2 will include the same kind of data. Both agent 1 metadata and agent 2 metadata can include the most recent engagement for a particular skill by the first and second agent, where the assessment outcome indicates the result of the engagement, e.g., win, loss, or draw for agent 1 and agent 2. The agent 1 update field records the updated proficiency score for the first agent, as provided by a relevant update function, e.g., modified Glicko2, with respect to the skill or feature engaged by the first agent and the second agent. Similarly, the agent 2 update field does the same for the second agent. The next block 315(2) can contain the same type of data, but for an engagement that involves different skills or the same skills, but for a different time, and similarly with respect to 315(n). As stated above, a ledger management component can query the distributed ledger 162 to obtain information concerning agents or users, and blocks such as block 300 will undergo a hashing process to provide the ultimate information sought and to ensure its veracity.

Figure 4:
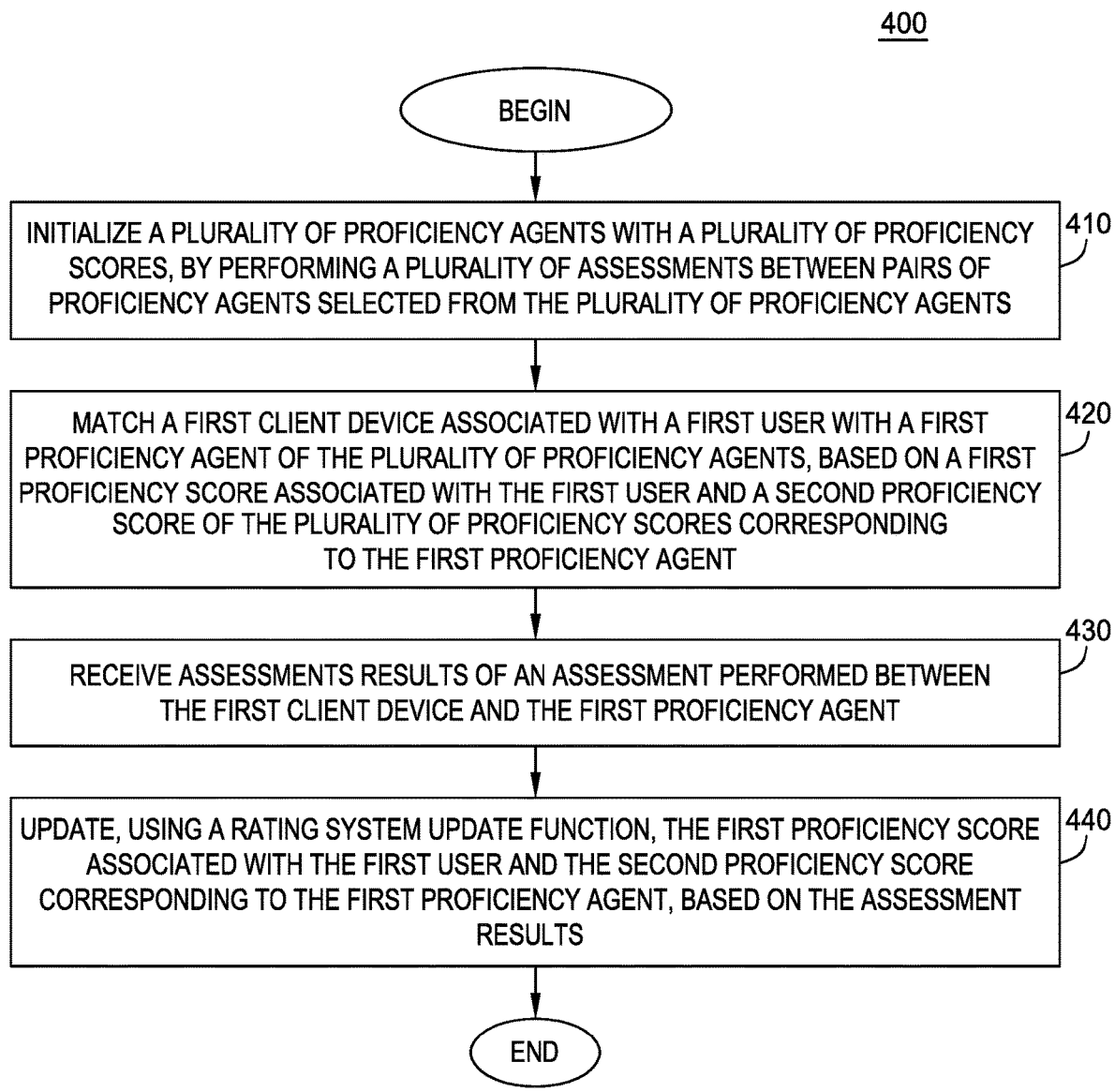
FIG. 4 is a flow chart illustrating a method for matching one or more user devices and/or users with one or more proficiency agents in accordance with at least one embodiment of the present disclosure.

FIG. 4 illustrates a flow diagram 400 outlining a matching scheme suitable for matching one or more users with one or more proficiency agents according to an embodiment of the present disclosure. According to block 410, a matchmaking component 144 initializes a plurality of proficiency agents, e.g., 182 and 184, with a plurality of proficiency scores by coordinating with a proficiency ranking component 132 to perform a plurality of assessments between pairs of proficiency agents selected from the plurality of proficiency agents, e.g., 182 and 184, where, as stated and implied, the proficiency agents 182, and pairs of the same, can include, but are not limited to, pairs of educational chat bots and/or a pair include an educational chatbot and a user, e.g. student.

In block 420, the matchmaking component 144 matches a first client device (e.g., client device 176(1)) associated with a first user (e.g., user 172(1)) with a first proficiency agent (e.g., an artificial intelligence component 182) of the plurality of proficiency agents, based on a first proficiency score associated with the first user and a second proficiency score for the plurality of proficiency scores corresponding to the first proficiency agent.

In block 430, a storage device, e.g., 156, and/or the matchmaking component 144 receives an assessment result from a proficiency ranking component 132 based on an assessment performed by the proficiency ranking component 132 and between the first client device and the first proficiency agent.

In block 440, a ranking update component 136, using a rating system update function, e.g., an iterative competitive game algorithm, will update the first proficiency score associated with the first user and the second agent proficiency score corresponding to the first proficiency agent, based on the assessment results.

Figure 5:
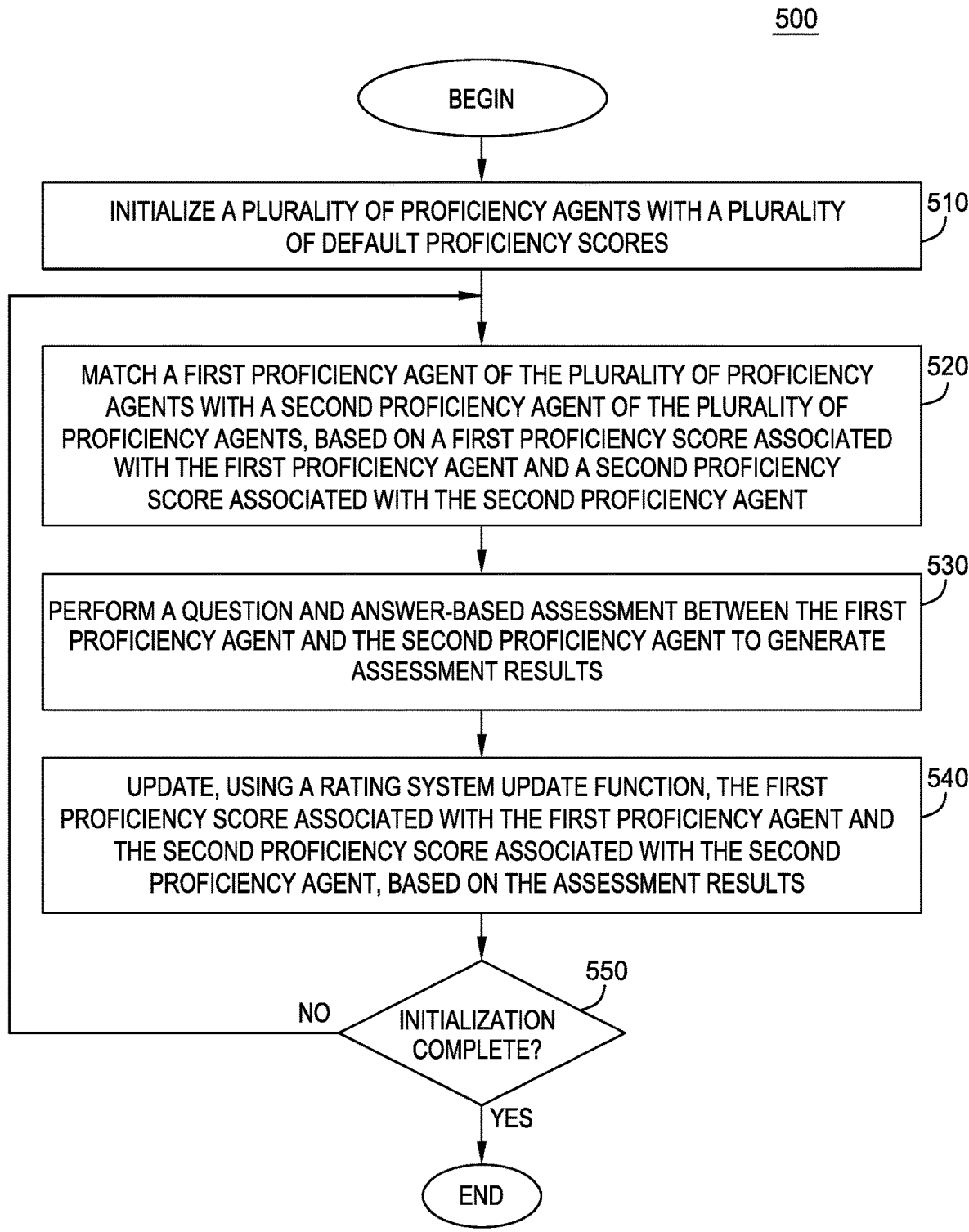
FIG. 5 is a flow chart illustrating a method for matching one or more user devices and/or users with one or more proficiency agents in accordance with at least one embodiment of the present disclosure.

FIG. 5 illustrates a flow diagram 500 outlining a matching scheme suitable for matching one or more users with one or more proficiency agents according to an embodiment of the present disclosure. In block 510, a matchmaking component 144 initializes a plurality of proficiency agents, e.g., 182 and 184, with a plurality of default scores.

In block 510, a matchmaking component 144 will match a first proficiency agent, e.g., 182, of the plurality of proficiency agents with a second proficiency agent, e.g., another AI system or 184, of the plurality of proficiency agents, based on a first proficiency score associated with the first proficiency agent and a second proficiency score associated with the second proficiency agent.

In block 530, a proficiency ranking component 132 will perform a question and answer-based assessment between the first proficiency agent and the second proficiency agent to generate assessment results.

In block 540, a ranking update component 136, using a rating system update function, e.g., an iterative competitive game algorithm, will update a storage device, e.g., 156, and/or the matching component 144 with the first proficiency score associated with the first proficiency agent and with the second proficiency score associated with the second proficiency agent.

In block 550 an engagement management component 148 determines whether a sufficient number of iterations of the update function have taken place before terminating the iteration and proceeding to the end of the flow. In one embodiment, the determination as to whether or not to terminate will be based on the structure of the competitive algorithm used, e.g., modified Glicko2 and the number of users and/or agents at issue, such that a meaningful distribution is reached that can permit future matching between agents or users based on the accuracy of the individual scores associated with the distribution.

Figure 6:
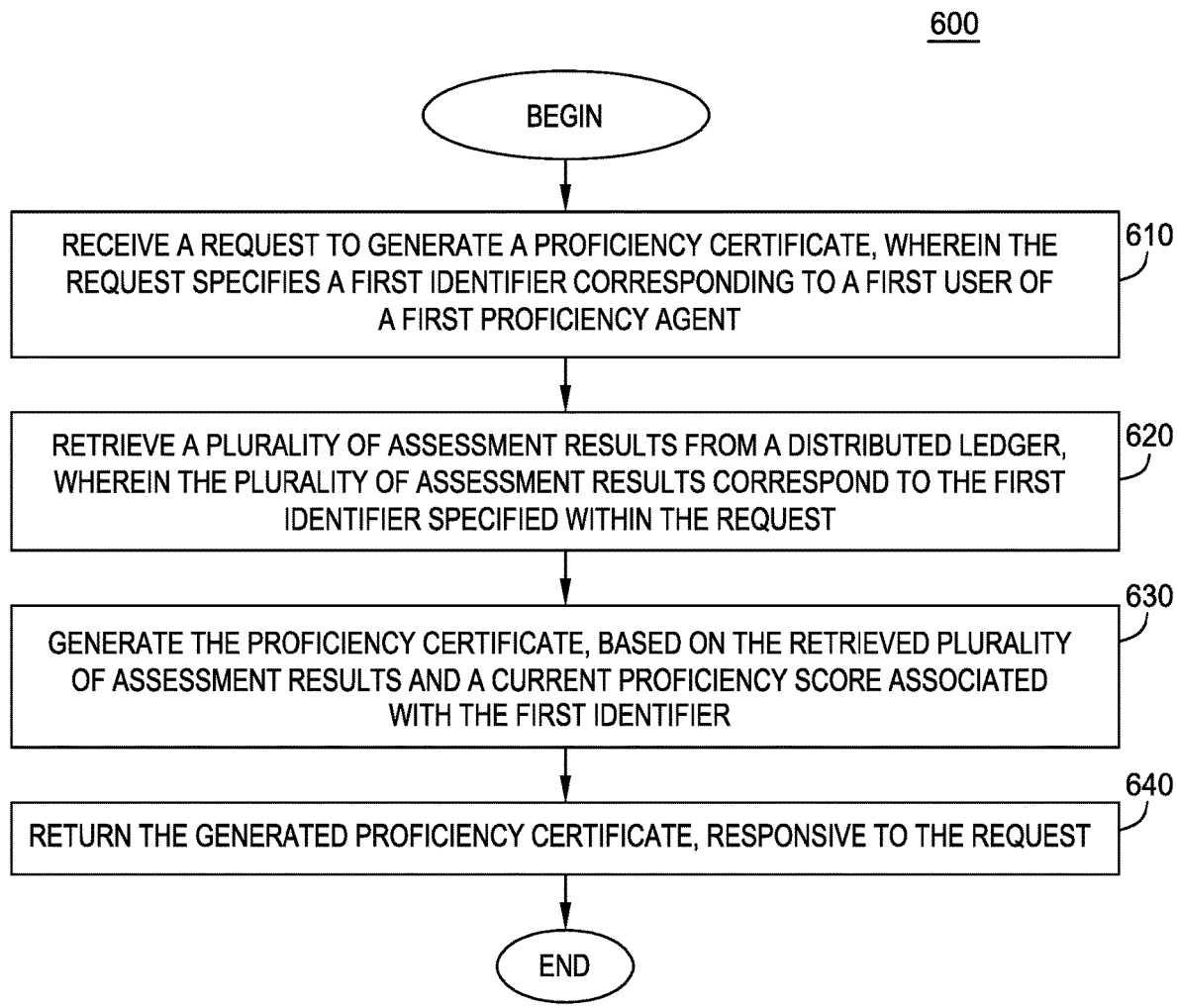
FIG. 6 is a flow chart illustrating a method for generating a proficiency certificate using a distributed ledger in accordance with at least one embodiment of the present disclosure.

FIG. 6 illustrates a flow 600 for generating a proficiency certificate using a distributed ledger in accordance with an embodiment of the present disclosure. In block 610, a ledger management component 140 receives a request from a client device, e.g., 176(1), to generate a proficiency certificate corresponding to a first user, e.g., 172(1) or a first proficiency agent 182.

In block 620, the ledger management component 140 retrieves a plurality of assessment results from a distributed ledger 162, e.g., a blockchain storing assessment results, where the assessment results correspond to an identifier specified within the request, and in block 630, the ledger management component 140 generates a proficiency certificate, based on the retrieval of a plurality of assessment results and a current proficiency score associated with the first identifier (which can also be retrieved from the ledger 162). In block 640, the ledger management component 140 returns the certificate to the requesting client device, e.g., 176(1) and by extension a user associated therewith, e.g., 172(1).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
matching, by a matchmaking component, a first proficiency agent, from a plurality of proficiency agents, with a second proficiency agent, from the plurality of proficiency agents, based on:
a first proficiency score, from a plurality of proficiency scores associated with the plurality of proficiency agents and corresponding to the first proficiency agent; and
a second proficiency score, from the plurality of proficiency scores associated with the plurality of proficiency agents and corresponding to the second proficiency agent;
receiving, by the matchmaking component, assessment results of an assessment performed between the first proficiency agent and the second proficiency agent, wherein the first and second proficiency agents are both artificial intelligence systems that process natural language input to generate natural language output;
updating, by a ranking update component and using a rating system update function, the first proficiency score associated with the first proficiency agent and the second proficiency score corresponding to the second proficiency agent, based on the assessment results; and
generating, by a ledger management component, a proficiency certificate based on the updated first proficiency score associated with the first proficiency agent.

2. The method of claim 1 further comprising:
initializing the plurality of proficiency agents with the plurality of proficiency scores by performing a plurality of assessments between pairs of proficiency agents selected from the plurality of proficiency agents.

3. The method of claim 2, wherein initializing the plurality of proficiency agents further comprises: prior to performing the plurality of assessments, setting a default proficiency score for each of the plurality of proficiency agents, and wherein a skill associated with each proficiency assessment is determined by a two-dimensional array that defines the skill associated with each proficiency assessment, wherein the rating system update function further comprises at least one of an Elo rating system update function, a Glicko-2 rating system update function, or a modified Glicko-2 rating system update function.

4. The method of claim 1, wherein matching the first proficiency agent with the second proficiency agent further comprises:

determining that the second proficiency score is a closest proficiency score, from the plurality of proficiency scores to the first proficiency score, that exceeds the first proficiency score.

5. The method of claim 1, wherein the first proficiency agent comprises an educational chatbot, and wherein the first proficiency agent is configured to perform the assessment by performing an operation that comprises:
generating an assessment question to be answered by the second proficiency agent;
receiving an answer, from the second proficiency agent, responsive to providing the assessment question; and
generating a score representing a determined correctness of the received answer.

6. The method of claim 5, wherein the rating system update function is configured to update the first proficiency score and the second proficiency score based on the generated score.

7. The method of claim 1, further comprising:
storing the assessment results within a distributed ledger.

8. The method of claim 7, wherein the distributed ledger further comprises a blockchain, and wherein the assessment results are stored within a current block of the blockchain.

9. The method of claim 7, further comprising:
receiving a request to generate the proficiency certificate for the first proficiency agent;
retrieving a plurality of assessment results from the distributed ledger, wherein the plurality of assessment results correspond to the first proficiency agent; and
generating the proficiency certificate based further on the plurality of assessment results retrieved from the distributed ledger.

10. The method of claim 1, further comprising:
determining an engagement metric for a first user, wherein the engagement metric comprises an n-dimensional value representing a level of engagement of the first user; and
altering a behavior of at least one of the plurality of proficiency agents based at least in part on the determined engagement metric.

11. The method of claim 1, wherein the first proficiency agent comprises a predefined assessment examination, and wherein the first proficiency agent is configured to perform the assessment by performing an operation that comprises:
providing a predefined assessment question to be answered by the second proficiency agent;
receiving an answer, from the second proficiency agent, responsive to providing the predefined assessment question; and
generating a score representing a determined correctness of the received answer based on one or more predefined answers corresponding to the predefined assessment question.

12. A system, comprising:
one or more computer processors; and
a memory containing computer program code that, when executed by operation of the one or more computer processors, performs an operation comprising:
matching, by a matchmaking component, a first proficiency agent, from a plurality of proficiency agents, with a second proficiency agent, from the plurality of proficiency agents, based on:
a first proficiency score, from a plurality of proficiency scores associated with the plurality of proficiency agents and corresponding to the first proficiency agent; and
a second proficiency score, from the plurality of proficiency scores associated with the plurality of proficiency agents and corresponding to the second proficiency agent;
receiving, by the matchmaking component, assessment results of an assessment performed between the first proficiency agent and the second proficiency agent, wherein the first and second proficiency agents are both artificial intelligence systems that process natural language input to generate natural language output;
updating, by a ranking update component and using a rating system update function, the first proficiency score associated with the first proficiency agent and the second proficiency score corresponding to the second proficiency agent, based on the assessment results; and
generating, by a ledger management component, a proficiency certificate based on the updated first proficiency score associated with the first proficiency agent.

13. The system of claim 12, the operation comprising:
initializing the plurality of proficiency agents with the plurality of proficiency scores by performing a plurality of assessments between pairs of proficiency agents selected from the plurality of proficiency agents.

14. The system of claim 13, wherein the initializing the plurality of proficiency agents further comprises, prior to performing the plurality of assessments, setting a default proficiency score for each of the plurality of proficiency agents, wherein a skill associated with each proficiency assessment is determined by a two-dimensional array that defines the skill associated with each proficiency assessment, and wherein the rating system update function further comprises at least one of an Elo rating system update function, a Glicko-2 rating system update function, or a modified Glicko-2 rating system update function.

15. The system of claim 12, wherein matching the first proficiency agent with the second proficiency agent further comprises:
determining that the second proficiency score is a closest proficiency score, from the plurality of proficiency scores to the first proficiency score, that exceeds the first proficiency score.

16. The system of claim 12, wherein the first proficiency agent comprises an educational chatbot, and wherein the first proficiency agent is configured to perform the assessment by performing an operation that comprises:
generating an assessment question to be answered by the second proficiency agent;
receiving an answer, from the second proficiency agent, responsive to providing the assessment question; and
generating a score representing a determined correctness of the received answer,
wherein the rating system update function is configured to update the first proficiency score and the second proficiency score based on the generated score.

17. The system of claim 12, the operation further comprising:
storing the assessment results within a distributed ledger, wherein the distributed ledger further comprises a blockchain, and wherein the assessment results are stored within a current block of the blockchain;
receiving a request to generate the proficiency certificate for the first proficiency agent;

retrieving a plurality of assessment results from the distributed ledger, wherein the plurality of assessment results correspond to the first proficiency agent; and generating the proficiency certificate based further on the plurality of assessment results retrieved from the distributed ledger.

18. The system of claim 12, the operation further comprising:

determining an engagement metric for a first user, wherein the engagement metric comprises an n-dimensional value representing a level of engagement of the first user; and altering a behavior of at least one of the plurality of proficiency agents based at least in part on the determined engagement metric.

19. The system of claim 12, wherein the first proficiency agent comprises a predefined assessment examination, and wherein the first proficiency agent is configured to perform the assessment by performing an operation that comprises:

providing a predefined assessment question to be answered by the second proficiency agent;

receiving an answer, from the second proficiency agent, responsive to providing the predefined assessment question; and generating a score representing a determined correctness of the received answer based on one or more predefined answers corresponding to the predefined assessment question.

20. A computer-readable storage medium containing computer program code that, when executed by operation of one or more computer processors, performs an operation comprising:

matching, by a matchmaking component, a first proficiency agent, from a plurality of proficiency agents, with a second proficiency agent, from the plurality of proficiency agents, based on:
 a first proficiency score, from a plurality of proficiency scores associated with the plurality of proficiency agents and corresponding to the first proficiency agent;
 a second proficiency score, from the plurality of proficiency scores associated with the plurality of proficiency agents and corresponding to the second proficiency agent;

receiving, by the matchmaking component, assessment results of an assessment performed between the first proficiency agent and the second proficiency agent, wherein the first and second proficiency agents are both artificial intelligence systems that process natural language input to generate natural language output;

updating, by a ranking update component and using a rating system update function, the first proficiency score associated with the first proficiency agent and the second proficiency score corresponding to the second proficiency agent, based on the assessment results; and generating, by a ledger management component, a proficiency certificate based on the updated first proficiency score associated with the first proficiency agent.

* * * * *